United States Patent
Bosga

(10) Patent No.: US 8,423,159 B2
(45) Date of Patent: Apr. 16, 2013

(54) METHOD AND SYSTEM FOR OPERATING A CYCLIC PRODUCTION MACHINE IN COORDINATION WITH A LOADER OR UNLOADER MACHINE

(75) Inventor: Sjoerd Bosga, Västerås (SE)

(73) Assignee: ABB Research Ltd., Zürich (CH)

( * ) Notice: Subject to any disclaimer, the term of this patent is extended or adjusted under 35 U.S.C. 154(b) by 1143 days.

(21) Appl. No.: 12/303,881

(22) PCT Filed: Jun. 6, 2007

(86) PCT No.: PCT/IB2007/001558
§ 371 (c)(1),
(2), (4) Date: Dec. 8, 2008

(87) PCT Pub. No.: WO2007/141649
PCT Pub. Date: Dec. 13, 2007

(65) Prior Publication Data
US 2010/0234974 A1    Sep. 16, 2010

(30) Foreign Application Priority Data

Jun. 6, 2006  (EP) ..................... 06011673

(51) Int. Cl.
*G05B 11/01*  (2006.01)
(52) U.S. Cl.
USPC ............. 700/19; 700/111; 700/112; 700/114; 901/6
(58) Field of Classification Search ............... 700/19; 901/15, 50, 6
See application file for complete search history.

(56) References Cited

U.S. PATENT DOCUMENTS

| | | | | |
|---|---|---|---|---|
| 3,685,756 A | * | 8/1972 | Marx et al. | 242/525.5 |
| 3,752,098 A | * | 8/1973 | Logan et al. | 112/470.07 |
| 3,844,142 A | * | 10/1974 | Miller | 68/19.1 |
| 3,847,079 A | * | 11/1974 | Dahlgren | 101/490 |
| 3,906,826 A | * | 9/1975 | Middendorf | 83/267 |
| 3,908,980 A | * | 9/1975 | Fowler | 271/3.14 |

(Continued)

FOREIGN PATENT DOCUMENTS

| | | |
|---|---|---|
| EP | 1279447 A2 | 1/2003 |
| EP | 1615090 A1 | 1/2006 |

(Continued)

OTHER PUBLICATIONS

PCT/ISA/210—International Search Report—Oct. 25, 2007.

(Continued)

*Primary Examiner* — Mohammad Ali
*Assistant Examiner* — Kelvin Booker
(74) *Attorney, Agent, or Firm* — Venable LLP; Eric J. Franklin

(57) ABSTRACT

A method for synchronizing a first machine of a manufacturing process section arranged to carry out a production cycle including a working part and a non-working part. The first machine is operated in conjunction with at least one second machine. The first machine carries out a process during the working part of the cycle on a workpiece that is loaded into and/or unloaded out of the first machine by the at least one second machine during the non-working part of each process cycle. Also, a system for carrying out the method and a computer program.

41 Claims, 4 Drawing Sheets

U.S. PATENT DOCUMENTS

| | | | | |
|---|---|---|---|---|
| 3,987,721 A * | 10/1976 | Alexander et al. | 72/405.06 |
| 3,997,067 A * | 12/1976 | Murata | 414/798.1 |
| 4,089,203 A * | 5/1978 | Wallis | 72/405.15 |
| 4,144,904 A * | 3/1979 | Dits | 137/625.3 |
| 4,150,616 A | 4/1979 | Schneider et al. | |
| 4,279,561 A * | 7/1981 | Schneider et al. | 414/591 |
| 4,321,864 A * | 3/1982 | Willsey | 99/500 |
| 4,341,546 A * | 7/1982 | Nitschke et al. | 65/163 |
| 4,378,688 A * | 4/1983 | Spanke et al. | 72/420 |
| 4,398,627 A * | 8/1983 | Saccani | 198/346.2 |
| 4,437,372 A * | 3/1984 | Ishigami et al. | 83/320 |
| 4,445,408 A * | 5/1984 | Keith | 83/323 |
| 4,462,741 A * | 7/1984 | Sogawa et al. | 414/752.1 |
| 4,502,376 A * | 3/1985 | Cosse | 425/382.3 |
| 4,523,076 A * | 6/1985 | Laymon | 219/125.1 |
| 4,571,320 A * | 2/1986 | Walker | 414/752.1 |
| 4,574,941 A * | 3/1986 | Tsuge et al. | 414/733 |
| 4,579,514 A * | 4/1986 | Repella | 425/338 |
| 4,580,964 A * | 4/1986 | Repella | 425/338 |
| 4,585,389 A * | 4/1986 | Watanabe et al. | 414/225.01 |
| 4,614,064 A * | 9/1986 | Bailey et al. | 451/83 |
| 4,619,395 A * | 10/1986 | Amorosi et al. | 228/4.5 |
| 4,633,720 A * | 1/1987 | Dybel et al. | 700/206 |
| 4,634,338 A * | 1/1987 | Tsuge et al. | 414/752.1 |
| 4,648,825 A * | 3/1987 | Heil et al. | 425/186 |
| 4,653,300 A * | 3/1987 | Crout et al. | 700/206 |
| 4,653,311 A | 3/1987 | Tack | |
| 4,693,101 A * | 9/1987 | Crout et al. | 700/206 |
| 4,698,991 A * | 10/1987 | Kirii et al. | 700/206 |
| 4,712,404 A * | 12/1987 | Crout et al. | 700/206 |
| 4,712,405 A * | 12/1987 | Crout et al. | 700/206 |
| 4,712,415 A * | 12/1987 | Crout et al. | 700/206 |
| 4,718,263 A * | 1/1988 | Crout et al. | 700/206 |
| 4,848,066 A * | 7/1989 | Luhman | 53/485 |
| 4,860,057 A * | 8/1989 | Saeki et al. | 355/23 |
| 4,912,501 A * | 3/1990 | Saeki et al. | 355/23 |
| 4,921,395 A * | 5/1990 | Sahlin | 414/744.3 |
| 5,017,083 A * | 5/1991 | Sahlin | 414/744.3 |
| 5,176,017 A * | 1/1993 | Tokai | 72/6.1 |
| 5,298,843 A * | 3/1994 | Miyajima et al. | 700/206 |
| 5,310,039 A * | 5/1994 | Butera et al. | 414/223.01 |
| 5,391,038 A * | 2/1995 | Stewart | 414/392 |
| 5,403,142 A * | 4/1995 | Stewart | 414/392 |
| 5,423,648 A * | 6/1995 | Akeel et al. | 414/733 |
| 5,524,521 A * | 6/1996 | Schwinn et al. | 101/484 |
| 5,644,915 A * | 7/1997 | Dressing et al. | 60/426 |
| 5,695,151 A * | 12/1997 | Schwandt et al. | 242/559.4 |
| 5,775,191 A * | 7/1998 | Burton et al. | 83/488 |
| 5,861,180 A * | 1/1999 | Kaneko et al. | 425/145 |
| 5,893,047 A * | 4/1999 | Gimblett et al. | 700/206 |
| 6,073,057 A * | 6/2000 | Bauer et al. | 700/206 |
| 6,122,565 A * | 9/2000 | Wenning et al. | 700/206 |
| 6,145,176 A * | 11/2000 | Egnaczak et al. | 28/107 |
| 6,240,335 B1 * | 5/2001 | Wehrung et al. | 700/230 |
| 6,242,877 B1 | 6/2001 | Irwin et al. | |
| 6,401,011 B1 * | 6/2002 | Hashimukai | 700/248 |
| 6,411,863 B1 * | 6/2002 | Dickman | 700/206 |
| 6,507,767 B2 * | 1/2003 | Bourne et al. | 700/165 |
| 6,510,786 B1 * | 1/2003 | Harsch | 100/286 |
| 6,647,874 B1 * | 11/2003 | Siegl et al. | 101/211 |
| 6,654,661 B2 * | 11/2003 | Schmitz | 700/206 |
| 6,853,876 B2 * | 2/2005 | Wehrung et al. | 700/230 |
| 6,901,335 B2 * | 5/2005 | Wang et al. | 702/35 |
| 7,000,537 B2 * | 2/2006 | Sano | 72/404 |
| 7,067,010 B2 * | 6/2006 | Biddle | 118/326 |
| 7,118,147 B2 * | 10/2006 | Fujii | 294/103.1 |
| 7,219,525 B2 * | 5/2007 | Kawamoto | 72/405.11 |
| 7,350,389 B2 * | 4/2008 | Reissenweber et al. | 72/305 |
| 7,394,555 B2 * | 7/2008 | Cox et al. | 700/133 |
| 7,417,386 B2 * | 8/2008 | Piefer et al. | 318/85 |
| 7,434,505 B2 * | 10/2008 | Suzuki et al. | 700/206 |
| 7,448,321 B2 * | 11/2008 | Rugamer | 101/216 |
| 7,453,677 B2 * | 11/2008 | Bucella et al. | 361/62 |
| 7,506,491 B2 * | 3/2009 | Rimondi | 53/510 |
| 7,540,447 B2 * | 6/2009 | Shiraishi et al. | 242/421 |
| 7,541,763 B2 * | 6/2009 | Aono et al. | 318/560 |
| 7,542,175 B2 * | 6/2009 | Schutte, III | 358/3.31 |
| 7,712,415 B2 * | 5/2010 | Rügamer | 101/485 |
| 7,752,964 B2 * | 7/2010 | Fischer et al. | 101/218 |
| 8,011,284 B2 * | 9/2011 | Rinaldo | 83/650 |
| 2001/0033146 A1 * | 10/2001 | Kato et al. | 318/568.22 |
| 2003/0205150 A1 | 11/2003 | Nagae | |
| 2004/0003729 A1 | 1/2004 | Aoshima | |
| 2004/0111339 A1 * | 6/2004 | Wehrung et al. | 700/230 |
| 2005/0131645 A1 * | 6/2005 | Panopoulos | 701/214 |
| 2005/0140090 A1 * | 6/2005 | Breeding et al. | 273/149 R |
| 2005/0145117 A1 * | 7/2005 | Du et al. | 100/281 |
| 2005/0177321 A1 * | 8/2005 | Wang et al. | 702/35 |
| 2006/0135042 A1 * | 6/2006 | Frost et al. | 451/5 |
| 2007/0032900 A1 * | 2/2007 | Venugopal et al. | 700/146 |
| 2008/0054829 A1 * | 3/2008 | Onishi et al. | 318/255 |
| 2008/0275593 A1 * | 11/2008 | Johansson | 700/245 |
| 2008/0295564 A1 * | 12/2008 | Kaneko et al. | 72/405.13 |
| 2009/0007617 A1 * | 1/2009 | Suzuki | 72/20.1 |
| 2009/0126453 A1 * | 5/2009 | Suzuki | 72/453.13 |
| 2010/0006650 A1 * | 1/2010 | Auboussier et al. | 235/439 |

FOREIGN PATENT DOCUMENTS

| | | | |
|---|---|---|---|
| GB | 1179447 A | | 1/1970 |
| GB | 2258186 A | | 2/1993 |
| JP | 06063669 A | * | 3/1994 |
| JP | 06-179099 | | 6/1994 |
| JP | 2001-198632 | | 7/2001 |
| JP | 2003320488 A | | 11/2003 |
| JP | 2005052855 A | * | 3/2005 |

OTHER PUBLICATIONS

PCT/ISA/237—Written Opinion of the International Searching Authority—Oct. 25, 2007.

PCT/IPEA/409—International Preliminary Report on Patentability—Jun. 23, 2008.

Office Action, dated Feb. 1, 2011, from the Korean Intellectual Property Office, issued in connection with counterpart Korean Patent Application No. 2009-7000220.

Office Action, dated Oct. 2, 2012, issued by the Japanese Patent Office in connection with counterpart Japanese Patent Application No. 2009-513794.

\* cited by examiner

METHOD AND SYSTEM FOR OPERATING A CYCLIC PRODUCTION MACHINE IN COORDINATION WITH A LOADER OR UNLOADER MACHINE

CROSS-REFERENCE TO RELATED APPLICATIONS

This application claims priority to European patent application 06011673.8 filed 6 Jun. 2006 and is the national phase under 35 U.S.C. §371 of PCT/IB2007/001558 filed 6 Jun. 2007.

TECHNICAL FIELD

The invention concerns an improved method for synchronising a first machine of a manufacturing process section with at least one second machine for loading and/or unloading the first machine. In particular, the invention discloses a process section in which the first machine comprises a mechanical press of a type used for pressings, stamping or punching of metal parts from blanks. The press is driven by at least one electric motor and the second machine is a loader or unloader machine such as an industrial robot.

TECHNICAL BACKGROUND

Mechanical presses such as a link press, a crank press, or an eccentric press are commonly used to produce automobile parts stamped or pressed from steel blanks. Todays large mechanical presses are most often driven by a flywheel. The function of the flywheel is to store the necessary energy to carry out a pressing operation. A relatively low power electric motor drives the flywheel so that before the start of a press operation the flywheel is rotating at the speed at which the pressing will occur. Mechanical servo presses drives of the "direct drive" or mechanical servo type use the power of a relatively high power electric servo motor to provide the energy for pressing. Another type of servo press is a "hybrid drive" type, or hybrid press. In this design the flywheel still provides the necessary energy for pressing, but power for the movement of the press is supplied in part by an additional servo motor, generally a smaller motor in a hybrid press than in a direct servo mechanical press.

In large press lines for the automotive industry, robots are often used to move parts from one press to the next. For optimal productivity, the motion of each unloading robot is synchronized to the motion of a press, and the motion of a loading robot is synchronized to the motion of the robot unloading the same press. The motion of the press itself can however not normally be controlled. Only the starting instant of the press operation can be chosen in relation to the motion of the loading robot.

The production cycle of a press as describe herein includes a pressing stage and a non-pressing stage. Stamping, pressing, punching, forming etc takes place during the pressing stage. After the pressing stage the non-pressing stage includes a first time after the press has begun to open in which a tool or robot may reach into the press and unload a workpiece that has been formed or pressed. After that and before the press closes a robot or other apparatus places a new workpiece in the press ready for the next pressing/forming operation. The objectives of the conventional type of synchronization of the press to the robot are commonly that:

the press should reach a certain point of its motion (called "Die Protect", DP) during loading of a part or blank not before the robot has passed a certain point of its motion, principally the time when the robot loader has withdrawn from between the moving parts of the press. Failure to do so in time means a collision will occur, causing damage to the press die and/or the robot tool, the press should pass the DP point as shortly as possible after the robot has passed the above certain point of its motion. Failure to do so means loss of time, i.e. reduced productivity.

The synchronization mechanism of today is based on the assumption that the press is standing still in a well-defined position at the start of every press cycle, and that the press will then move with a pre-defined motion profile that cannot be varied. These operating conditions are a direct consequence of the mechanical construction of the press drive, which consists of a flywheel, a clutch and a brake. In contrast to that, servo press drives of either the "direct drive" or "hybrid drive" type, have fundamentally different constraints.

For example a servo press may be arranged with a drive that has a peak power of around 10 times the peak power of the motor that drives the flywheel in today's presses. Such a servo motor allows very rapid acceleration of the press from standstill to high speed. The press could thus be started and stopped in much the same way as a traditional flywheel-clutch-brake combination, and synchronization to robots would be very similar to the existing scheme. However, since such high peak power comes with unacceptably high drive and installation costs, one may instead use a press with a servo drive with much lower peak power. For example a peak power of the direct or auxiliary motor may be arranged to be between 1 and 4 times that of the traditional flywheel motor. A disadvantage of this approach is that accelerating the press from a standstill to maximum speed takes 1-1.5 seconds, which is much slower than accelerating using the clutch, and thus takes a significant part of the production cycle (which may typically be around 5 seconds total).

SUMMARY OF THE INVENTION

According an aspect of the present invention an improvement is provided to methods for operating a first machine of a manufacturing process section arranged to carry out a production cycle, said production cycle comprising a pressing part and a non-pressing part, which said first machine is operated in conjunction with at least one second machine and which said first machine carries out a process during the working part of the cycle on a workpiece which is loaded into and/or unloaded out of said first machine by said at least one second machine during the non-working part of each process cycle, and synchronising said first machine to said second machine by controlling the speed of said first machine to decelerate said first machine at a point before the start point of an unloading stage after which unloading is permitted and dependant on a speed or position of said second machine.

According to an embodiment of the present invention an improvement is provided to methods for operating a first machine of a manufacturing process section arranged to carry out a production cycle, which said first machine is operated in conjunction with at least one second machine by synchronising the speed of said first machine to said second machine by controlling the speed of said first machine and accelerating or decelerating it according to an estimated time for said second machine to reach the beginning point or end point of an unloading or loading stage of the process cycle.

According to an embodiment of the present invention an improvement is provided to methods for operating a first machine of a manufacturing process section arranged to carry out a production cycle, which said first machine is operated in conjunction with at least one second machine by synchronising the speed of said first machine to said second machine by controlling the speed of said first machine and by decelerating said first machine at a start point before an estimated time at which said first machine shall reach the beginning of the unloading point stage towards zero speed and accelerating said first machine to reach the end point of the loading stage at the highest possible speed.

According to another embodiment of the present invention an improvement is provided to methods for operating a first machine of a manufacturing process section arranged to carry out a production cycle, said production cycle comprising a pressing part and a non-pressing part, which said first machine is operated in conjunction with at least one second machine and which said first machine carries out a process during the working part of the cycle on a workpiece which is loaded into and/or unloaded out of said first machine by said at least one second machine during the non-working part of each process cycle, and synchronising by reversing said first machine after reaching a zero speed and subsequently accelerating in a forward direction so that said first machine is running at the highest possible speed, which may be greater than a normal pressing speed, when it reaches the end point of the loading stage.

According to an embodiment of the present invention an improvement is provided to methods for operating a first machine of a manufacturing process section arranged to carry out a production cycle, which said first machine is operated in conjunction with at least one second machine and synchronising by reversing said first machine after reaching a zero speed and subsequently accelerating said first machine in the forward direction so that it reaches a zero speed for a second time such that said first machine is running at the highest possible speed when it reaches the end point of a loading stage.

According to another embodiment of the present invention an improvement is provided to methods for operating a first machine of a manufacturing process section arranged to carry out a production cycle, which said first machine is operated in conjunction with at least one second machine, and synchronising by upon detecting that the loading stage is being delayed, before the deceleration time has begun before beginning of unloading, by subsequently changing from positive torque to negative torque and accelerating said first machine in a forward direction from an increased reverse angle so that said first machine reaches the end of the loading stage in the shortest possible time.

According to another embodiment of the present invention an improvement is provided to methods for operating a first machine of a manufacturing process section arranged to carry out a production cycle, which said first machine is operated in conjunction with at least one second machine, and synchronising by estimating a time at which said second machine shall reach the beginning of the unloading point stage (UC), then calculating from the estimate a time at which said first machine shall reach the end point of the loading stage (DP).

According to another embodiment of the present invention an improvement is provided to methods for operating a first machine of a manufacturing process section arranged to carry out a production cycle, which said first machine is operated in conjunction with at least one second machine, and synchronising by calculating a point at which deceleration of said first machine is to be started, such that the speed of said first machine at the start of the unloading phase and at the end of the loading phase is as high as possible, and that the end of the loading phase point is reached at the moment loading is completed.

According to an embodiment of the present invention an improvement is provided to methods for operating a first machine of a manufacturing process section arranged to carry out a production cycle, which said first machine is operated in conjunction with at least one second machine by synchronising the speed of said first machine to said second machine by controlling the speed of said first machine wherein data describing the motion of said second machine collected during a finite or infinite number of previous cycles is used in addition, to calculate the desired time instant.

The invention comprises ways to adapt the motion of the press so that the press is synchronized to the motion of the unloader and/or loader robot, resulting in optimal cycle times. The proposed method comprises changing setpoints in the press motion depending on an estimated synchronization time point. The invention also provides a method for automatically optimizing the press line while in operation. Also, proposed methods are described that may be used for synchronizing the unloader robot to the press as well. To optimise the productivity of press lines and/or servo press line, motion of the presses should be synchronized to the motion of the loading equipment and vice versa. Especially for the reversing ("alternative bi-directional") motion, this requires a new concept for synchronization, different from what has been used for mechanical presses. A press line comprises a number of presses, usually arranged to carry out a sequence of operations. In this specification the term "press line" may also include a single press and a mechanised loader and/or unloader.

For the purpose of control the inventors describe the production (pressing) cycle as comprising two parts: the pressing stage, and the non-pressing stage. In the non-pressing stage the press is called "open". During the non-pressing stage the press is sufficiently opened for a loader/unloader to enter the press for loading and/or unloading. The open part of the cycle is limited by two points in the cycle. The first point is called here the UC point (unload cam), the earliest point in the cycle where the unloader can enter the press without any collision taking place. The second point is the DP point (die protect), the point after which the loader must be out of the press to avoid a collision. According to an aspect of the invention DP is not treated as a fixed position in the cycle. When the press is moving slowly (for example when braking) the press is allowed to move further down than when moving fast, since DP is chosen so that when at DP emergency braking is started, a loader or unloader inside the press is not touched. Since braking at high speed requires a braking longer distance, DP is higher (earlier in the cycle) at high speed than at low speed.

Servo drive (direct/full and hybrid) systems for mechanical presses introduce two new conditions on the synchronization of the press to the robot according to the invention, which conditions comprise:

the press should pass the DP point as it is closing with as high speed as possible. Since the speed after DP affects the cycle time, the press should be accelerated as much as possible before this point. Note: before DP the cycle time depends on the speed of the robots, since here the press is essentially waiting for the robots; and, the press should pass the UC point as it is opening with as high speed as possible.

The second condition may require some further explanation. The UC point, where UC stands for Unload Cam, is the point in the press motion where the press has opened sufficiently for the unloader robot to enter the press. See for example FIG. 8 where the UC point in a (clockwise) forward cycle is shown some degrees after pressing and, in this case, before TDC. From a control point of view, UC is the point in time of the beginning of the unloading stage.

Traditionally, the motion of the press near this point has no relation whatsoever with the synchronization of the press to a loader near the DP point. However according to the servo concept herein described, and in particular when using "alternative bi-directional motion" such as described in an EP application number EP 06011673.8 filed on 2006 Jun. 6, and which is hereby incorporated in this specification in full by means of this reference, the press may never stop completely between UC and DP. The inventors have determined that optimal press motion, for a given motor size, press, etc may in certain cases require starting full-torque deceleration before reaching UC, and upon reaching zero speed, reversing the press over a certain angle, also with full torque, and then, without pausing, re-accelerating the press with full torque until after passing DP.

Typically the main advantage is a shortened production cycle time. In production settings where more than one press works in a same or related production process, or is one press in a line of several presses, the inventive synchronisation methods provides greater opportunity for optimization of a press line by adaptively controlling the motion of each of the presses and feeders or transfer mechanisms/unloaders such as loading/unloading robots, in the process or press line.

For example, line coordination of an entire process section may be improved by controlling such a line using a single controller arranged to carry out methods according to an embodiment of the invention, due in part to the improved controllability of the direct servo or hybrid servo presses. Coordination or optimisation may be achieved in part by adapting speed during opening/closing a press (while for example maintaining a required speed and energy output during the pressing/stamping part of the cycle), resulting in cycle times which may be reduced dependent on parameters such as: a state of a downstream process; or a state of an upstream process or another consideration such as overall power consumption; reduced energy consumption; smoothing power consumption peaks in the press line.

A feature of the disclosed methods is that an improved prediction for the estimated time of arrival of the press at synchronisation points such as UC and DP is used. This estimate is also adaptive, and may be updated before the actual arrival at a synchronisation point. The improved estimate is produced by a motor control function. Since the control of a direct servo or hybrid servo press is by means of motor control a frequency converter and a motor controls the motion of the press. The press controller is able to calculate and predict the exact moment the press will cross the unload-cam angle. Since press speed is controlled by the direct servo or hybrid servo motor, this prediction can be more accurate than a traditional prediction (which is based on an assumption of a constant speed operation for a traditional mechanical press with, for example, an eccentric wheel). The press control communicates the estimate of the moment it will arrive at UC to the unloader controller, which will control the unloader robot to enter the press exactly as soon as the press motion allows it on or after UC. While the press is moving closer to the unload-cam angle, the press control can, if necessary, send an updated prediction of time of arrival at UC to the unloader controller. The loader control in turn then communicates to the press control the moment it has calculated an estimated time for the loader to leave the press. The press control then determines when to start, resume, or change speed of the press motion and how to control the press speed such that the press crosses the die-protect angle DP at exactly at the moment the loader leaves the press. All the time while loading, the loader control can send, if necessary, and updated prediction.

As a result of this synchronization method, better synchronization will be possible than with today's system, resulting in a reduced cycle time. It may even be possible to increase the die-protect angle, which will result in a further reduction.

As only time instants are communicated between press control and unloader resp. loader control, the required communication bandwidth between these controllers is low. This is an advantage in case the press control is a separate unit, i.e. not integrated with unloader or loader control.

Another advantage of the invention is that it is applicable to a range of conditions. For example the proposed methods are not limited to the case where maximum motor torque is a constant. The torque used in deceleration and acceleration is advantageously equal to the maximum torque which the drive can supply, but this maximum may be a function of motor speed, of motor temperature, converter temperature, limitations imposed by gears, other mechanical constraints, etc.

Another advantage is that the proposed synchronization method is not limited to a mechanical press with an eccentric mechanism. It can be used on presses with a so-called link-drive mechanism as well, without modification. With some modifications, the method may also be used on a mechanical press using a ball-screw mechanism (typically using bi-directional operation). Also, the method can both be used for servo presses of the hybrid type (in which a clutch and flywheel is used to give force while pressing) and the direct type (in which no clutch is present).

Although the method is described for the case where the press in every cycle moves in the same direction, with some modifications the method can be used also on a press in which every other cycle is performed in a different direction (bi-directional motion).

The proposed method for predicting robot motion can also be used for predicting press motion. Since press motion depends on many parameters (masses of different parts of the mechanism, adjustment of pressure in counter-balance cylinders, mass of the upper die, etc), which are difficult to take into account in a press controller, it is proposed to analyse on-line the motion of the press for given settings such as pressing speed, position where deceleration is started at or before the beginning of the unloading stage, position or time or speed at which torque is reversed, max press speed). Based on the motion obtained during a finite or infinite number of previous press cycles, the above mentioned settings can be adapted such that an optimal cycle time and time instant for passing DP is obtained.

The method provides the highest possible productivity for a press line. Motion may be optimised in relation to other machines in a production sequence when for example blanks are loaded in the press and/or stamped parts unloaded from the press by transfer devices or other automated devices. Such other machines in the production sequence may be one or more robots. Controlling the press in synchronisation with control of the feeding by automatic feeders, other feeders, doppins, robot loaders/unloaders, etc provides the advantage of synchronization of feeder/loader motion and press motion, providing in reduced overall production process cycle times without compromising pressing quality. A press line comprises a number of presses, usually arranged to carry out a sequence operations. In this specification the term press line may also include a single press and a mechanised loader and/or unloader.

In a preferred embodiment of the method of the invention the method may be carried out by a computing device comprising one or more microprocessor units or computers. One or more control unit(s) comprise memory means or a memory storage device for storing one or more computer programs for carrying out the improved methods for controlling the operation of a mechanical press. Preferably such computer program contains instructions for the processor to perform the method as mentioned above and described in more detail below. In another embodiment the computer program is provided on a computer readable data carrier such as a DVD, or stored in a computer readable storage device.

BRIEF DESCRIPTION OF THE DRAWINGS

Embodiments of the invention will now be described, by way of example only, with particular reference to the accompanying drawings in which:

FIG. 5 is a schematic flowchart showing a synchronisation method for synchronising the press to an unloader or loader robot in the case of a late unloader, according to an embodiment of the invention;

FIG. 6 is a schematic flowchart showing a synchronisation method for synchronising the press to a loader or unloader robot in the case of an early loader, according to another embodiment of the invention; and FIG. 8 is a schematic diagram for a press production cycle showing a forward angular rotation in a clockwise direction, with reversing, together with angular positions of UC and DP according to an embodiment of the invention.

DETAILED DESCRIPTION OF THE EMBODIMENTS

Synchronization of the press to a loader robot or other loader machine as described here comprises two parts. The first part is related to obtaining a prediction of the instant when the loader robot will pass the synchronization point. The second part consists of methods for adapting the press motion so that optimal synchronization is obtained.

Figure 1:
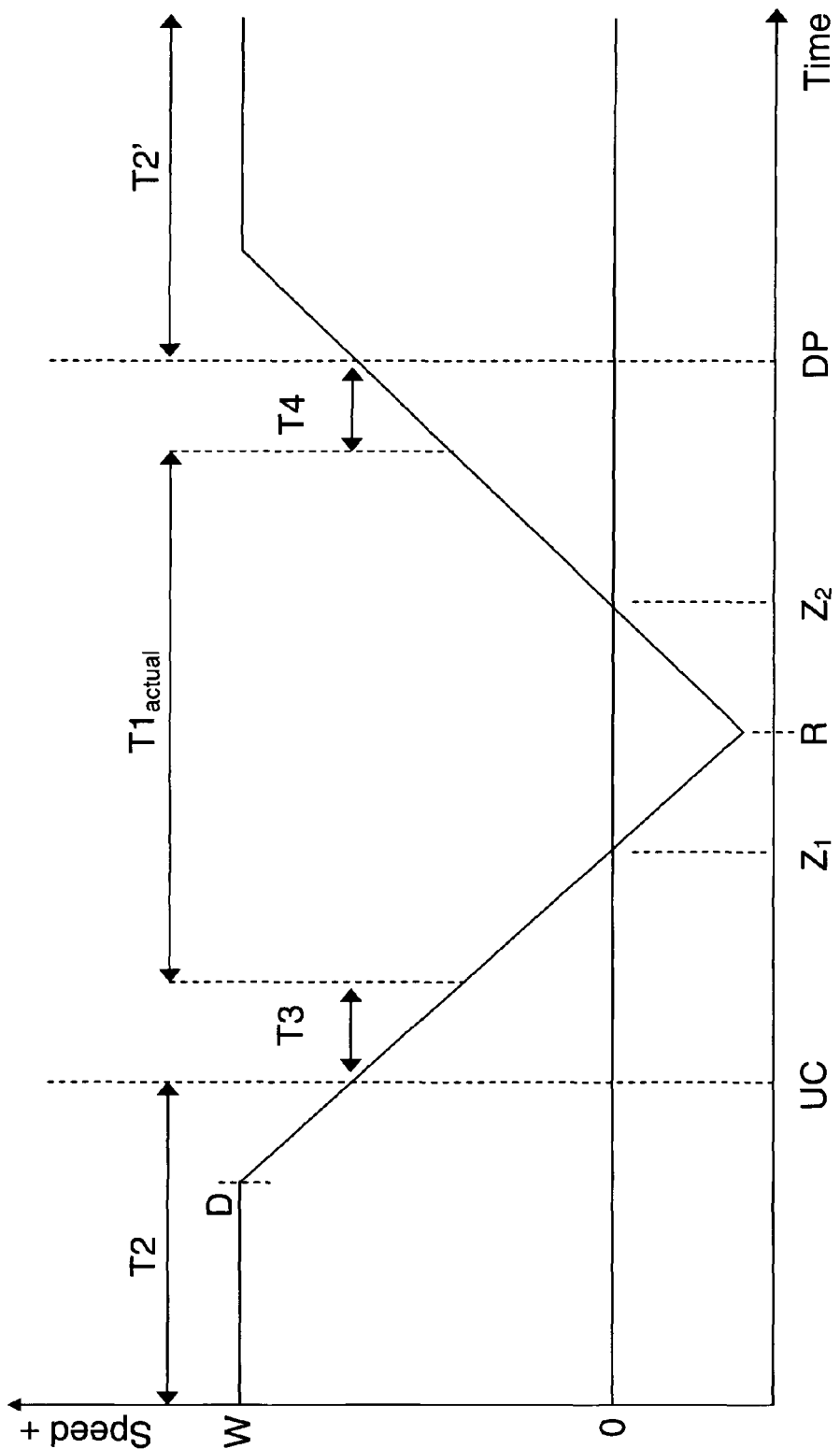
FIG. 1 is a schematic diagram showing a production cycle in which a non-pressing part is divided into three time intervals relevant to synchronising a press with a second machine, according to an embodiment of the invention.

Synchronisation may be described in terms of dividing the cycle of the press into the following four parts, as shown in FIG. 1. The figure shows a speed/time diagram for press cycle. This shows, staring from the left side of the diagram the press running at a speed W which may be a maximum speed. At or after D, a point before UC (unload cam, the earliest point for unloading) deceleration of the press may begin. After UC the non-pressing stage has begun. FIG. 1 shows that during the non-pressing stage there are three parts T3, T1 and T4, where:

T3 is the time between the moment the press crosses UC position and the moment the unloader enters the press;

T1 is the time the unloader and the loader are inside the press;

T4 is the time the loader is outside the press, before the press crosses DP position.

Secondly and during the pressing stage T2:

T2 is the time the press is closed, this includes closing, pressing (working part of the cycle) and opening; this is the total time between passing DP and passing UC. Total cycle time, which determines productivity, is T1+T2+T3+T4.

The goal of the synchronization of the unloader to the press is to minimize T3 ie so that T3 should approach zero or be zero. Another goal of the synchronization of the unloader to the press is also to ensure that the unloader enters the press as fast as possible, so as to minimize the unloader dependent part of T1. The goal of synchronization of the loader to the unloader is also to minimize T1.

The goal of the synchronization of the press to the loader may be related to more than one time period. First of all synchronization shall minimize T4. When T4 is zero, this means that the press crosses DP exactly when the loader leaves the press (although there may be some safety margin included). Second, it aims to minimize the total pressing stage time T2. This is done by ensuring that the speed of the press at DP and the speed of the press at UC are both as high as possible. In a steady state, an optimum for T2 is found where the speed at UC and the speed at DP may be approximately equal.

In case of very fast unloader/loader equipment, or a very powerful servo drive, or a very large angular distance between DP and UC, the speed at UC and DP may be equal to the maximum speed of the press. In that case, deceleration of the press can be started after UC, and re-acceleration will complete at or before DP. In this case, it may be possible to operate the drive (between UC and DP) at less than maximum torque, without deterioration of the cycle time. This would be appropriate to reduce energy losses in the drive.

However, typically these three conditions are not all fulfilled. In this case, the shortest possible cycle time is obtained by operating the motor at maximum torque during deceleration, any possible reversing, and re-acceleration. In this case, deceleration will be started before reaching UC, at a point D, and reacceleration will continue even after passing point DP.

Since the control of a direct servo or hybrid servo press is by means of motor control, eg a frequency converter and a motor controls the motion of the press. The press controller is able to calculate and predict the exact moment the press will cross the unload-cam angle. Since press speed is controlled, this prediction can be more accurate than a traditional prediction (which is based on the assumption of constant speed operation of a mechanical press with, for example an eccentric wheel). The press control communicates the estimate of the moment it will arrive at UC to the unloader controller, which will control the unloader robot to enter the press exactly as soon as the press motion allows it on or after UC. While the press is moving closer to the unload-cam angle, the press control can, if necessary, send an updated prediction of time of arrival at UC to the unloader controller.

The loader control in turn then communicates to the press control the moment it calculates an estimated time to leave the press. The press control then determines when to start or resume the press motion and how to control the press speed such that the press crosses the die-protect angle DP at exactly at the moment the loader leaves the press. All the time while loading, the loader control can send, if necessary, and updated prediction the estimated time to leave the press to the press control. Unlike in today's mechanical presses, the servo press will allow a degree of adaptation of the press motion even after starting the motion.

Figure 2:
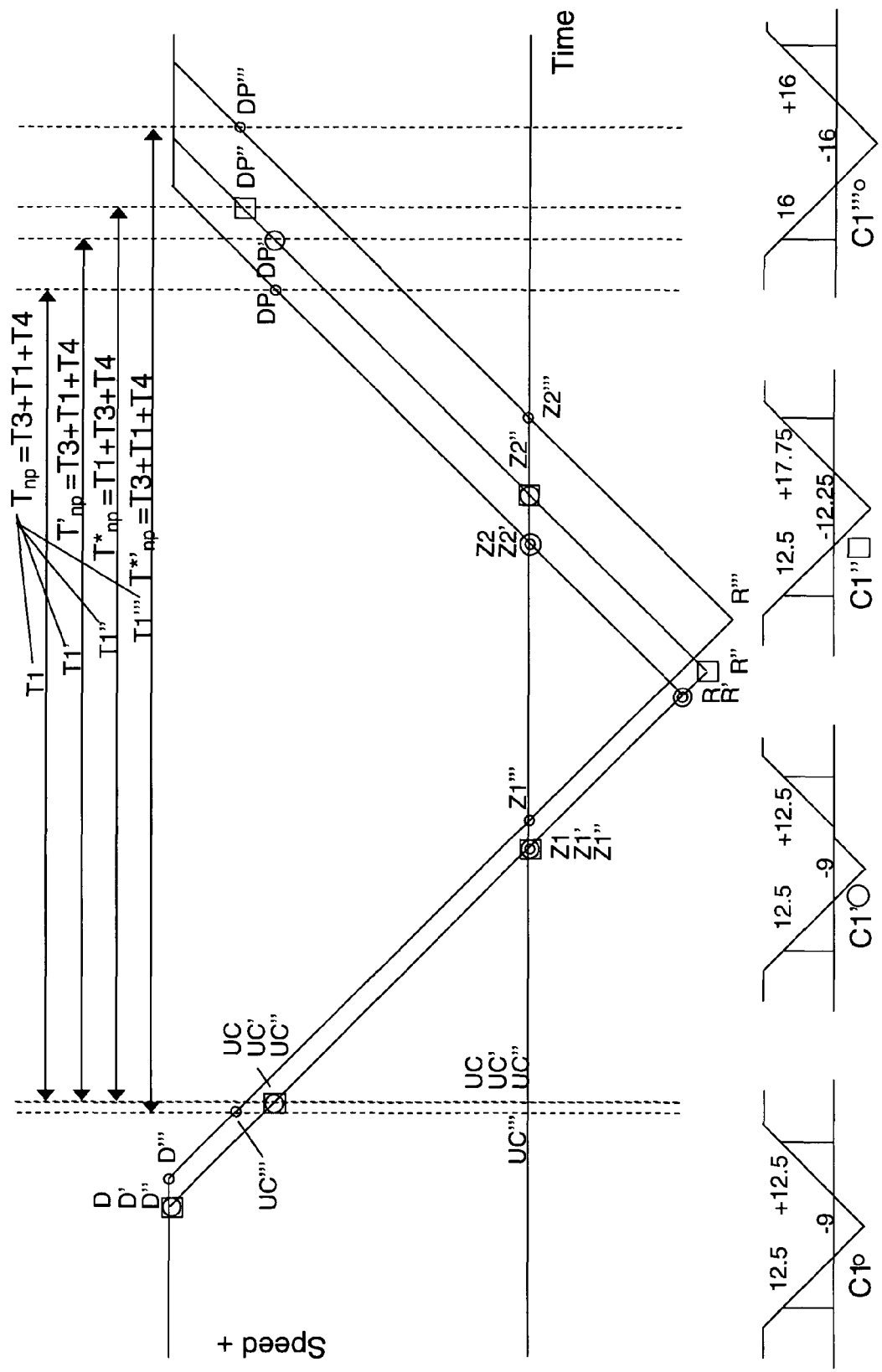
FIG. 2 is a schematic diagram showing speed-time profiles for a press cycle showing synchronisation points on the profiles relevant to synchronising a press with a second machine operating as a loader which may be late, according to an embodiment of the invention.
Figure 3:
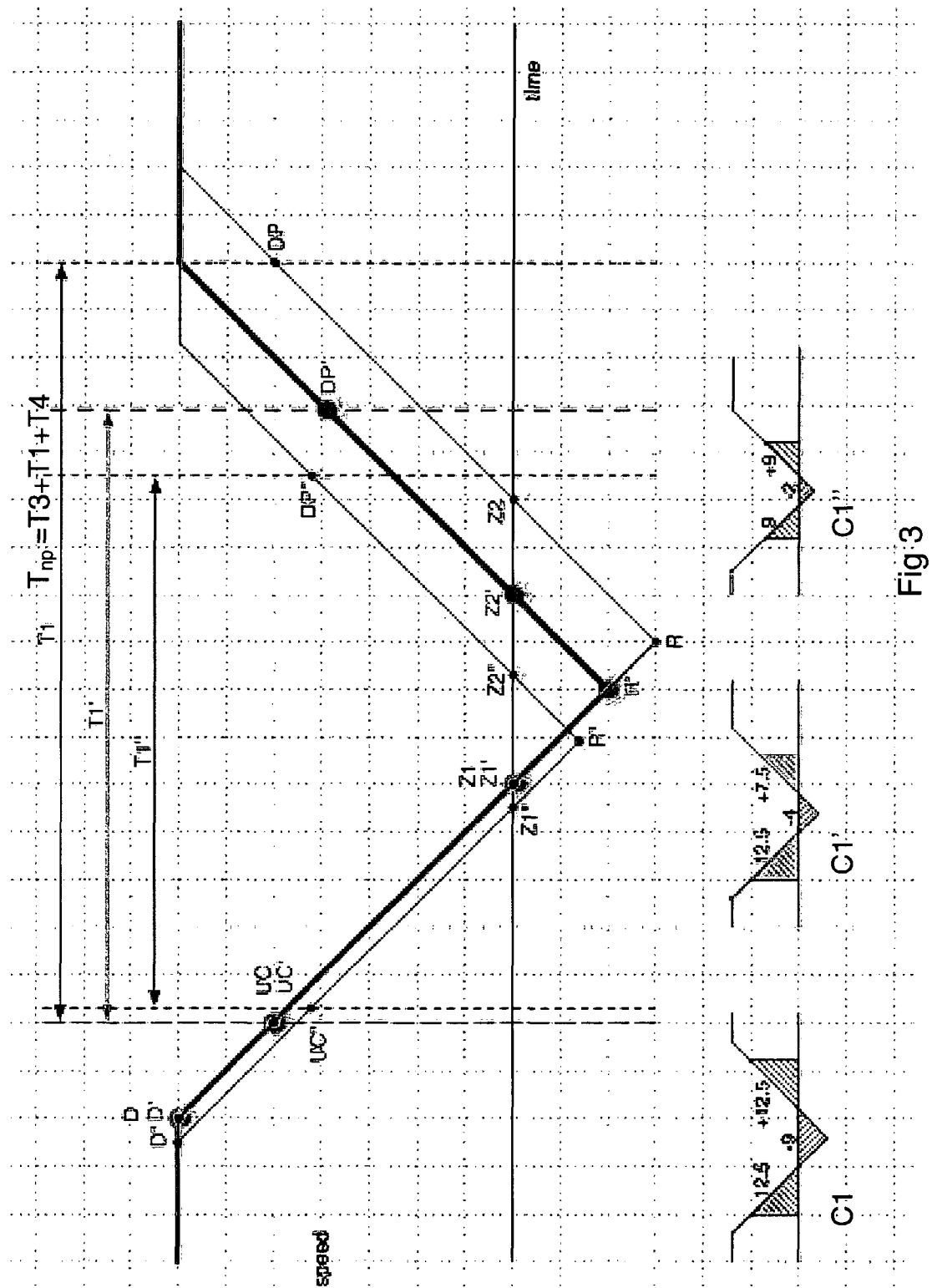
FIG. 3, is a schematic diagram is showing speed-time profiles in a case where reversing movement of a press is limited to a small angle, according to another embodiment of the invention.
Figure 4:
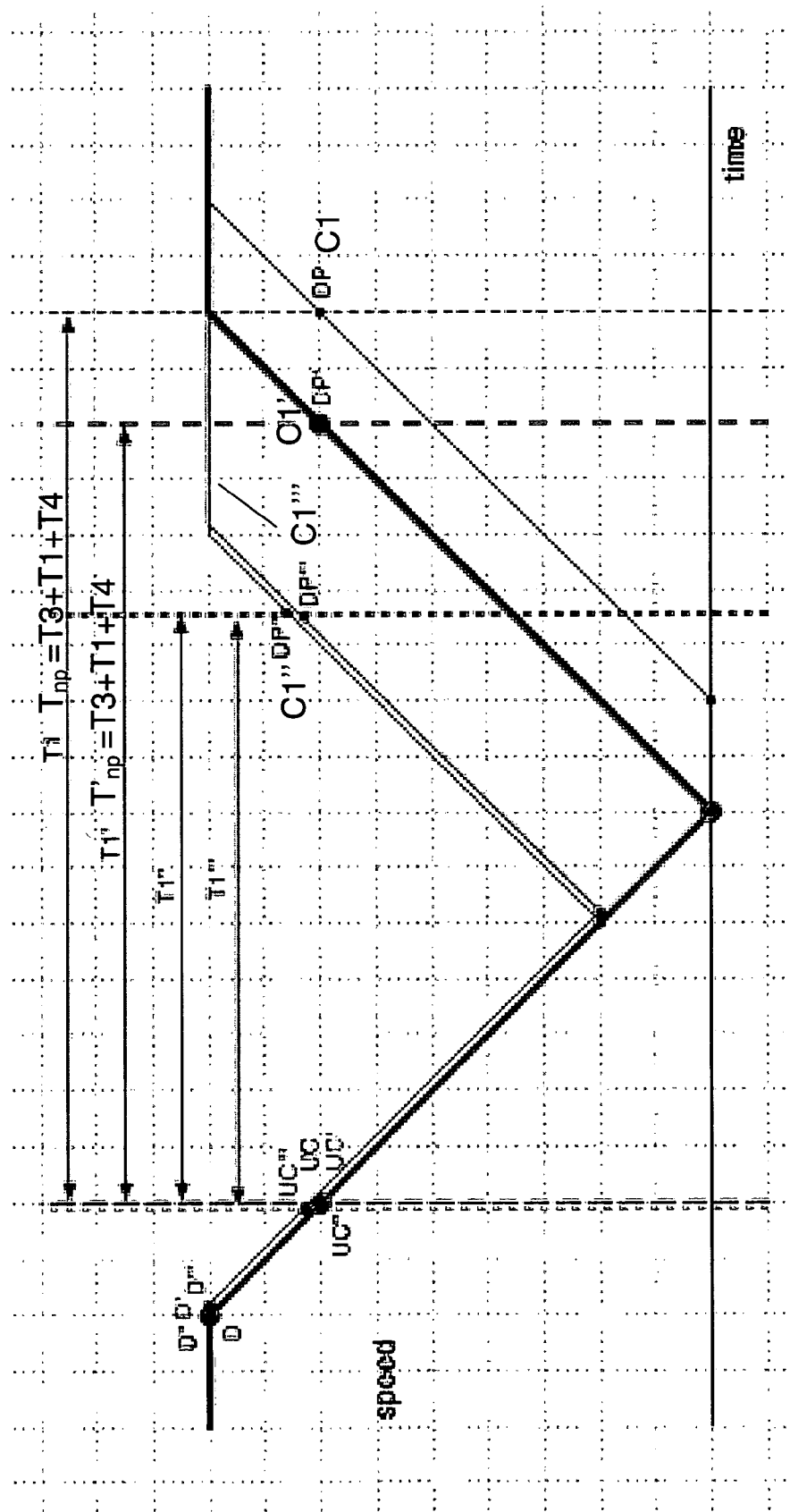
FIG. 4 is a schematic press cycle showing the synchronisation points on the speed profiles on a press cycle in which reversing does not occur, according to an embodiment of the invention.

Three methods for synchronization are described in FIGS. 2-4, one of which, the C1 line of FIG. 4, is similar result to synchronization of a mechanical press, but the other methods are new and specific to the servo press with bi-directional motion. Methods for synchronizing to a late loader are illustrated in FIG. 2. FIG. 2 shows four speed profiles C1, C1', C1'', C1''' on axes of press speed and time. All four profiles pass a point at the beginning UC of an unloading stage, at which a time $T_{np}$ starts to run. The figure shows a first profile C1. In the figure, T3+T1+T4 is the time needed by the robots for unloading and loading the press. This time starts at UC (assuming the unloader is ideally synchronized to the press) and terminates at DP (assuming the press reaches this point exactly when the robot has finished loading).

In FIG. 2, the C1 curve represents the optimal press motion for a given robot unloading and loading time $T_{np}$. In this motion, deceleration starts at a point D, before reaching the point UC where unloading starts. From point D, the press decelerates at full torque. It passes point UC, and reaches zero speed at point Z1. Motion continues with the same full torque, which now causes the press to reverse, which in the examples in FIGS. 1-4 and 8 means to rotate in an anti-clockwise direction. At point R, which has been calculated so that DP will be reached at a time $T_{np}$=T3+T1+T4 after passing UC, the sign of the torque is changed. The press now slows down its reversing motion until zero speed is reached for a second time at point Z2. The press then continues with full torque until after DP when full speed is reached and into the pressing stage. Thus the press is synchronised in this way as the slave of a loader device.

FIG. 8 shows a production cycle of a press with reversing and in terms of angular rotation and the traditional press cycle positions of TDC (Top dead centre) and BDC (Bottom dead centre). FIG. 8 shows the press moving in a clockwise direction past BDC and towards TDC. The press has a zero speed or crosses zero speed at $Z_1$. Upon reaching $Z_1$ in the diagram the press then reverses to a point shown R, and reverses again to a forward, clockwise, direction and crosses zero speed again at $Z_2$. The press continues accelerating, most often at full torque, to pass through DP at the maximum speed. This may be compared to the same events in FIGS. 2, 3.

Which method of synchronization to a later loader is chosen depends on the moment during the motion at which information about the lateness is obtained. (See also FIG. 6.) If information is obtained after passing point R', synchronization will consist of pausing the motion of the press at point Z2, as shown by the C1' curve in FIG. 2. This method gives a result which is similar to the synchronization of the mechanical press—the press waits before being restarted at Z2'. The motion profile of the press as a function of the position of the press is not affected by this method.

If information about the lateness of the loader is available earlier in the cycle, i.e after passing point D but before passing point R, synchronization is advantageously obtained by changing position of point R. By reversing over a greater angle, as illustrated by the C1'' curve in FIG. 2, not only is a longer $T_{np}$''=T3+T1+T4 time obtained, but the speed at DP'' is also increased. This results in a decrease in cycle time compared to the case where the press would have waited at Z2 to obtain the same $T_{np}$.

If information about the lateness of the loader is available still earlier in the cycle, i.e. before passing point D, synchronization is advantageously obtained by changing point D where deceleration is started. By starting deceleration later, and at the same time adapting point R, a shorter cycle time for a given $T_{np}$, is obtained than by changing point R alone. This is due to the fact that when deceleration is started later, high speed is maintained for a longer time, and a higher speed is reached at DP.

FIG. 7 shows the general adaptation deceleration/acceleration. FIG. 5 shows the adaptation of deceleration/acceleration of the press depending on at which point in time information about a late unloader is known. Thus as shown in FIG. 5 the following steps may be carried out:
60 find out before D
61 unloader robot will be late to D,
 then 62 set D later
60 find out before D
64 unloader robot will be on time
50a Decelerate drive motor from D at max torque, and
52 Set motor torque to reverse at full torque and pass through zero speed $Z_1$;
65 find out after D before R that
66 loader robot will be late to DP
 then 67 reverse over a greater angle to R
54 set motor to change torque sign at R and accelerate forward at full torque and pass through zero speed again $Z_2$,
68 find out after R that loader robot will be late to DP
 then 70 pause at point $Z_2$ and then
56 accelerate drive motor to max speed or W1 so that the press is at maximum speed when it reaches DP.

Similarly FIG. 6 summarises the adaptation of deceleration/acceleration of the press depending on at which point in time information about an early loader becomes known. Thus as shown in FIG. 6 the following steps may be carried out:
71 find out well before D that
72 loader robot will arrive early at D
 then 62 set D earlier, and
50a decelerate drive motor from point D at maximum torque,
52 set motor to reverse at full torque and pass through zero speed $Z_1$
74 find out after D and before R that loader robot will arrive early at DP
 then 76 reverse to R over a lesser angle,
54 set motor to change torque sign at R and accelerate forward at full torque and pass through zero speed again $Z_2$,
56 accelerate drive motor to max speed or W1 so that the press reaches DP at maximum speed.

The application of these methods is limited by the angle of press motion that is available for reversing. Should the press reverse too much this may, for example, cause a collision between the press and the unloader and/or loader near point Z2. Similarly if, for example, deceleration is started too late, there is a risk that near point Z1 the press closes so much that a collision occurs.

FIG. 3 gives an example of how the different points D, Z1, R, Z2 and DP may be located for a case where the press reverses only over a small angle (see also FIG. 3 below).

Synchronization to an early loader is done with similar methods, as illustrated in FIG. 4. However, if information about an early loader is obtained only after passing point R, there is no possibility for the press to adapt its motion since after this point it is already accelerating at full torque. If information about the earliness of the loader is known after the start of deceleration but before point R, synchronization is obtained by moving point R closer to point Z1, as shown by the C1' curve in FIG. 3. Unfortunately, as this curve shows, DP is passed at a lower speed, but the cycle time lost in longer acceleration after DP is more than compensated by a gain in cycle time since DP is reached much earlier.

If information about the earliness of the loader is known before the start of deceleration, synchronization is obtained by starting deceleration earlier, as shown by the C1" curve. Again, this earlier deceleration will result in a deterioration of the press time (UC" and DP" are passed at a lower speed), which is more than compensated by the gain in $T_{np}$, as DP is reached much earlier. This method gives a slightly improved cycle time compared to the case where information about the earliness was know after the start of deceleration.

From the above it is clear that for optimal synchronization, a reliable prediction of the robot motion is essential. The inventers recommend that the robot controller is used to calculate a prediction (estimate) for the time instant when the press should reach DP position, and update this estimate during the robot motion. The described method for predicting the time instant when the press should reach DP position comprises two parts, as previously mentioned. Since it is important for the control of the press to know the required time instant already before the start of deceleration at the end of the press cycle, it is not possible to rely on a real-time estimate or prediction of the robot motion alone. In fact, the motion of the loader robot is most likely not exactly known this early in the cycle, since the loader robot early in the cycle may still be working as unloader robot for another press or is being synchronized to the unloader robot of this press. That is to say that for part of the cycle the loader robot is synchronised as a slave to the unloader robot. However, motion of this robot will typically be the same in every cycle. It is therefore proposed to calculate an estimate, a prediction, based on the motion of the loader robot during a finite or infinite number of previous press cycles, and use this estimate to determine the starting point for deceleration of the press, and possibly also point R of the press motion. Once the loader robot is no longer synchronized to the unloader robot, it may be able to provide an accurate estimate of its own motion. At this moment the loader robot controller can provide an accurate target time update for the estimated time at which the press will reach DP during the present cycle. This target time may then replace the target time calculated based on previous cycles.

Instead of robots for loading and unloading the press, other types of loading/unloading equipment may also be used, such as transfer mechanisms specifically designed for this task. In another embodiment, the calculations for the prediction of when a loader/unloader will reach a certain point may be carried out in a control device or control unit other than a robot controller.

The described method for synchronizing a bi-directional motion of the press to the motion of something else (another device) can be applied to the motion of an (unloader) robot as well. For unloading the press as fast as possible, it is important for the unloader to enter the press not only at the exact moment when the press crosses the UC position, but to do this at as high speed as possible. By introducing "alternative bi-directional" motion for the unloader robot, and synchronizing this motion to the press, unloading will be faster than with todays synchronization method. In this specification, the words "alternative bi-directional motion" is used to mean: instead of stopping a motion in the middle between two points to wait for synchronization, allow deceleration over a longer distance, then move backwards over a certain distance, and finally reaccelerate from an earlier position.

For cases where not enough time is available for alternative bi-directional motion, or reversing for some reason is not allowed or possible, the proposed methods can also be adapted for uni-directional motion. This has been illustrated in FIG. 4. For short unloading/loading times, the motion becomes continuous, i.e. there is no point where zero speed is reached. FIG. 4 shows the synchronisation points on the speed profiles on a press cycle in which reversing does not occur, but in which a variable waiting time may occur.

The described methods are not limited to the case where maximum motor torque is a constant. The torque used in deceleration and acceleration is advantageously equal to the maximum torque which the drive can supply, but this maximum may be a function of motor speed, of motor temperature, available voltage, converter temperature, limitations imposed by gears, other mechanical constraints, etc. The described synchronization method is not limited to a press with an eccentric mechanism. It can be used on pressed with a so-called link-drive mechanism as well, without modification. With some modifications, the method can be used on a press using a ball-screw mechanism (typically using bi-directional operation). With similar modifications, the method can be used on a direct (i.e. not hybrid) servo press using bi-directional operation or also alternative bi-directional operation.

The proposed method for predicting robot motion can also be used for predicting press motion. Since press motion depends on many parameters (masses of different parts of the mechanism, adjustment of pressure in counter-balance cylinders, mass of the upper die, etc), which are difficult to take into account in a press controller, it is proposed to analyse on-line the motion of the press for given settings (such as pressing speed, position D where deceleration is started, position R where torque is reversed, max press speed). Based on the motion obtained during a finite or infinite number of previous press cycles, the above mentioned settings can be adapted such that an optimal cycle time and required time instant for passing DP is obtained.

FIG. 8 shows a schematic diagram for a press cycle according to an improved method for operating a mechanical press according to an embodiment of the invention. The figure shows, in this case for rotation in a clockwise direction, the press approaching the deceleration point D at point 8 just before the UC point. Deceleration begins and the press rotates through UC, when the unloader/loader enters the press to unload the part. The press continues to decelerate at maximum torque and passes through zero speed at $Z_1$ and is then reversed over a small angle from $Z_1$ to R'. At point R' the press is accelerated at full torque in the forward, clockwise direction again, and passes through zero for a second time at $Z_2$' accelerating from $Z_2$' toward DP so as to pass DP at the greatest possible speed towards point 1. By the time the press reaches DP the loader/unloader robot that has been loading a new part must be out of the press. In the pressing stage, in a traditional mechanical press with a flywheel, the working part of pressing usually occurs at or during the time the press arrives at the BDC position. At this time, the speed of a traditional press tends to drop as energy is transferred into the workpiece. However in a hybrid servo or direct servo press according to an embodiment of the invention, the hybrid or direct servo motor may be re-accelerated at any selected time after impact which may be before BDC is reached, eg at the point dp in FIG. 8.

Electrical power consumption of the drive motor of a press may be improved or smoothed by use of regenerative braking. The second motor in particular may be decelerated to a reduced speed or to a zero speed by means in part of regenerative braking. For example a speed reduction from W1 to Wp during the pressing stage, and a speed reduction at after UC in the non-pressing stage from W1 to zero. A system carrying out methods according to an embodiment of the invention may comprise energy recovery means for recovering energy from the first or second motor of the press or first machine during deceleration or braking. This may be any recovery means such as for example electrical, mechanical or chemical. This may involve use of one or more capacitors, batteries, mechanical device such as flywheels, mechanical springs or devices comprising a reservoir of a compressible fluid. For example energy recovered from the second motor may be stored in the flywheel driven by the first drive motor. The stored energy is principally reused during one or more of the following periods of the press cycle: initial acceleration at start of the press cycle; pressing; reacceleration after pressing; acceleration while reversing; reacceleration of the flywheel after pressing.

In a similar way electrical power consumption of the drive motor of a direct servo press may be improved (or smoothed) by use of regenerative braking. The amount of energy to be regenerated (and/or smoothed) would be grater than for a hybrid servo machine of a similar press tonnage). The servo motor in particular may be decelerated to a reduced speed or to a zero speed by means in part of regenerative braking. For example a speed reduction from W1 to Wp during the pressing stage, and a speed reduction in the non-pressing stage from W1 to zero. A system carrying out methods according to an embodiment of the invention may comprise energy recovery means, such as any of the above examples in the previous paragraph for a hybrid press, for recovering energy from the servo motor of the press or first machine during deceleration or braking.

In other embodiments:
loader control will typically have synchronization also with the unloader of the previous press in the line (not shown in figures). Unloader control will typically give synchronization signals to the loader of the next press in the line;
while the figure shows a motor control using a position sensor on the motor, this sensor might be replaced by a position estimation algorithm (sensorless control);
while typically a rotational sensor is used for the position of the eccentric wheel, alternatively a linear sensor giving the die position can be used;
press control may be integrated with motor control, possibly in a single processor (as a part of the drive unit consisting of press control, motor control and converter);
press control may be integrated with unload control or loader control, equivalent to the control of an external axis in a robot controller;
there may be a higher-level control that controls a complete press line or part of it. Communication between the controls shown may go through the higher-level control or through a bus;
the unloader of one press may be the same physical unit as the loader of the next press. In that case the unloader control for one press may be the same hardware as the loader control of the next press. I.e. the proposed method can be applied regardless whether unloading and loading is performed by a single robot, two separate robots, or an even larger number of robots. Instead of standard robots, also dedicated loading/unloading apparatus can be used.

One or more microprocessors (or processors or computers) comprise a central processing unit CPU performing the steps of the methods according to one or more aspects of the invention, as described for example with reference to the flowchart of FIG. 7 or the flow schemes of FIGS. 5 and 6. The method or methods are performed with the aid of one or more computer programs, which are stored at least in part in memory or in a computer readable storage device accessible by the one or more processors. It is to be understood that the computer programs for carrying out methods according to the invention may also be run on one or more general purpose industrial microprocessors or computers instead of one or more specially adapted computers or processors.

The computer program comprises computer program code elements or software code portions that make the computer or processor perform the methods using equations, algorithms, data, stored values, calculations and the like for the methods previously described, for example in relation to FIGS. 5-7 and in relation to the speed profile of FIGS. 2-4 and to the methods described in relation to FIGS. 5-6. The computer program may include one or more small executable programs. A part of the program may be stored in a processor as above, but also in a ROM, RAM, PROM, EPROM or EEPROM chip or similar memory means. The or some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, including removable memory media, or stored on a data server. The program may also in part be supplied from a data network, including a public network such as the Internet. The computer programs described may also be arranged in part as a distributed application capable of running on several different computers or computer systems at more or less the same time.

It should be noted that while the above describes exemplifying embodiments of the invention, there are several variations and modifications which may be made to the disclosed solution without departing from the scope of the present invention as defined in the appended claims.

The invention claimed is:

1. A method for operating a first machine of a manufacturing process section arranged to carry out a production cycle, said production cycle comprising a pressing part and a non-pressing part, which said first machine is operated in conjunction with at least one second machine and which said first machine carries out a process during a working part of the production cycle on a workpiece which is loaded into and/or unloaded out of said first machine by said at least one second machine during a non-working part of each process cycle, the method comprising:
synchronizing said first machine to said second machine dependent on a speed or position of said second machine by adaptively controlling a speed of said first machine to decelerate said first machine at a point before a start point after which unloading is permitted; and
synchronizing the speed of said first machine to said second machine by controlling the speed of said first machine and by decelerating said first machine at a start point before an estimated time at which said first machine shall reach the beginning of the unloading point stage towards zero speed and accelerating said first machine to reach an end point of a loading stage at a highest possible speed.

2. The method according to claim 1, further comprising:
synchronizing the speed of said first machine to said second machine by controlling the speed of said first machine and accelerating or decelerating the speed of the first machine according to an estimated time for said second machine to reach a beginning point or an end point of an unloading or loading stage of the production cycle.

3. The method according to claim 2, further comprising:
reversing said first machine after reaching a zero speed and subsequently accelerating said first machine in the forward direction so that the first machine reaches a zero speed for a second time such that said first machine is running at a highest possible speed when the first machine reaches the end point of the loading stage.

4. The method according to claim 2, further comprising:
upon detecting, after changing direction to the forward direction, that the loading stage shall be delayed, by holding said first machine at zero speed for a period of time before changing to positive torque and accelerating in the forward direction to full forward speed.

5. The method according to claim 2, further comprising:
upon detecting that the loading stage shall be delayed at a time before the deceleration time before unloading begins, by delaying the change in torque and start of deceleration to a later time point.

6. The method according to claim 2, further comprising:
upon detecting that the loading stage may begin early at a time after the deceleration has begun and before said first machine has changed to the forward direction, by reversing over a narrower angle and changing from negative torque to positive torque at an earlier point in time than planned,
or, upon detecting that the loading stage may begin early at a time before the deceleration time before unloading begins, by reversing over a still narrower angle and changing from negative torque to positive torque at a still earlier point in time than planned, before driving the press in the forward direction.

7. The method according to claim 2, further comprising:
upon detecting that the loading stage may begin early at a time after before the start of deceleration time before unloading, by starting deceleration at an earlier point in time, and earlier begins, by reversing said first machine after reaching a zero speed and subsequently accelerating in a forward direction so that the unloading-loading time is reduced.

8. The method according to claim 1, further comprising:
reversing said first machine after reaching a zero speed and subsequently accelerating in a forward direction so that said first machine is running at a highest possible speed when the first machine reaches an end point of a loading stage.

9. The method according to claim 1, further comprising:
upon detecting that the loading stage is being delayed, before the deceleration time at point has begun before beginning of unloading,
by subsequently changing from positive torque to negative torque and accelerating said first machine in a forward direction from an increased reverse angle or
after the deceleration has begun and before said first machine has changed from negative to positive torque to move in the forward direction, by instead continuing on negative torque and reversing over a greater angle and changing to positive torque at a later point in time than planned, and accelerating subsequently in the forward direction
so that said first machine reaches the end of the loading stage in the shortest possible time.

10. The method according to claim 1, further comprising:
reversing said first machine after reaching a zero speed and upon detecting before the deceleration time before unloading begins that the loading stage shall be delayed, by subsequently changing from negative torque to positive torque at a later point in time and thus accelerating said first machine in a forward direction so that the press reaches the end of the loading stage in the shortest possible time.

11. The method according to claim 10, further comprising:
utilizing in the calculation of start of deceleration point data describing the motion of said first machine during a finite or infinite number of previous cycles.

12. The method according to claim 1, further comprising:
estimating a time at which said second machine shall reach the beginning of the unloading point stage, and
calculating from the estimate a time at which said first machine shall reach the end point of the loading stage.

13. The method according to claim 12, further comprising:
determining a point in time at which to start reducing the speed of a forward motion of said second machine towards zero.

14. The method according to claim 1, further comprising:
calculating a point at which drive torque is changed from maximum negative to maximum positive such that the end point of the loading stage is reached at a desired time instant with as high speed as possible.

15. The method according to claim 14, further comprising:
calculating the desired time instant based on the actual position and/or speed of said second machine.

16. The method according to claim 15, further comprising:
calculating the desired time instant additionally utilizing data describing the motion of said second machine collected during a finite or infinite number of previous cycles.

17. The method according to claim 16, further comprising:
constraining the calculation of point R, or the calculation of start of deceleration point by that the motion of the first machine should not interfere with the motion of said second or other machine.

18. The method according to claim 1, further comprising:
calculating a point at which deceleration of said first machine is to be started such that the speed of said first machine at the start of the unloading phase and at the end of the loading phase is as high as possible, wherein the end of the loading phase point is reached at the moment loading is completed.

19. The method according to claim 1, further comprising:
operating said first machine and optimizing the speed of said first machine such that said first machine obtains the highest possible speed at the beginning of unloading of the non-pressing part of the process cycle, while at the same time minimizing the time difference between exit of the loader from the press and the end point of the loading stage.

20. The method according to claim 1, further comprising:
operating said first machine and optimizing the speed of said first machine such that said first machine obtains the highest possible speed at the beginning of unloading of the non-pressing part of the process cycle, while at the same time reaching a maximum speed at the end point of the loading stage.

21. The method according to claim 1, further comprising:
reversing either of said first machine or said at least one second machine during the loading/unloading part of the cycle.

22. The method according to claim 1, wherein said first machine is a mechanical press carrying out a pressing operation on the workpiece during the working or pressing part of the process cycle.

23. The method according to claim 1, wherein said second machine is a robot loader and/or unloader loading the workpiece into and/or out of said first machine during the loading/unloading part, the non-pressing part, of the process cycle.

24. A method for operating a first machine of a manufacturing process section arranged to carry out a production cycle, said production cycle comprising a pressing part and a non-pressing part, which said first machine is operated in conjunction with at least one second machine and which said first machine carries out a process during a working part of the production cycle on a workpiece which is loaded into and/or unloaded out of said first machine by said at least one second machine during a non-working part of each process cycle, the method comprising:
- synchronizing said first machine to said second machine dependent on a speed or position of said second machine by adaptively controlling a speed of said first machine to decelerate said first machine at a point before a start point after which unloading is permitted
- recovering energy from the first machine with regenerative braking;
- recovering energy from the press and storing it in an energy recovery unit; and
- smoothing electrical power consumption of a press.

25. A system, comprising:
- a manufacturing process section comprising a first machine arranged to carry out a production cycle comprising a working part and a non-working part, said first machine being operated in conjunction with at least one second machine, said first machine carrying out a process during the working part of the cycle on a workpiece that is loaded into and/or unloaded out of said first machine by said at least one second machine during the non-working part of each process cycle; and
- at least one control device arranged for adaptively controlling said first machine to decelerate said first machine from a point before the start point after which unloading is permitted dependant on a speed or position of said second machine thereby synchronizing said first machine to said second machine by controlling the speed of said first machine, wherein said at least one control device comprises a speed control configured to decelerate said first machine from a point before an estimated time at which said first machine shall reach the beginning of the unloading point stage towards zero speed and accelerating said first machine after reaching a zero speed to reach the end point of the loading stage at the highest possible speed.

26. The system according to claim 25, wherein said at least one control device comprises hardware and/or software for estimating a time at which said second machine shall arrive at the beginning of the unloading point stage to unload said first machine.

27. The system according to claim 25, wherein said at least one control device comprises hardware and/or software for estimating a time at which said second machine will arrive at the end point of the loading stage.

28. The system according to claim 25, wherein said at least one control device comprises a module configured to change the speed and/or direction of at least one drive motor of said first machine.

29. The system according to claim 25, wherein said at least one control device comprises a module configured to change torque magnitude and/or sign of at least one drive motor of said first machine.

30. The system according to claim 25, wherein at least one said first machine comprises a mechanical press comprising at least one electric drive motor, a drive control configured to control the motor, a ram, a flywheel, a clutch and a member for translating rotational motion of said flywheel in a first rotation direction into a linear motion of said ram arranged to be lowered and raised along a linear path for operating said press to carry out a press production cycle including a pressing part and one or more non-pressing parts of said cycle.

31. The system according to claim 25, wherein the mechanical press comprises a second drive motor or actuator arranged connected to said ram and by providing a control output to a drive control of said second drive motor such that the speed of said second drive motor is varied during at least one part of a said press production cycle.

32. The system according to claim 25, wherein at least one said first machine comprises a mechanical press comprising at least one electric drive motor, a drive control means for controlling the motor, a ram, and a member for translating rotational motion into a linear motion of said ram arranged to be lowered and raised along a linear path for operating said press to carry out a press production cycle including a pressing part and one or more non-pressing parts of said cycle.

33. The system according to claim 25, wherein at least one said first machine comprises a mechanical press comprising at least one electric drive motor, a drive control means for controlling the motor, a ram, and a member for translating rotational motion of said flywheel in a first rotation direction into a linear motion of said ram arranged to be lowered and raised along a linear path for operating said press to carry out a press production cycle including a pressing part and one or more non-pressing parts of said cycle.

34. The system according to claim 25, wherein at least one said first machine comprises a mechanical press comprising at least one electric drive motor, a drive control means for controlling the motor, a ram, and a member for translating rotational motion of said flywheel in a first rotation direction into a linear motion of said ram arranged to be lowered and raised along a linear path for operating said press to carry out a press production cycle including a pressing part and one or more non-pressing parts of said cycle.

35. The system according to claim 25, wherein said second machine comprises a robot loader and/or unloader loading the workpiece into and/or out of the first machine during the loading/unloading part of the process cycle.

36. The system according to claim 25, wherein said second machine comprises a transfer device.

37. The system according to claim 25, wherein either said first machine or said at least one second machine may be reversed during the loading and/or unloading part of the cycle.

38. The system according to claim 25, wherein said at least one control device comprises hardware and/or software for determining a point in time or reversing angle or speed at which to change the speed of a forward motion or a reverse motion of said second machine by changing the sign of the torque.

39. The system according to claim 25, wherein the at least one control unit comprises one or more computer programs for controlling the speed or torque of at least one drive motor of said first machine.

40. A computer program product, comprising:
- a non-transitory computer readable medium; and
- computer program instructions recorded on the computer readable medium and executable by a processor for carrying out a method for operating a first machine of a manufacturing process section arranged to carry out a production cycle, said production cycle comprising a pressing part and a non-pressing part, which said first machine is operated in conjunction with at least one second machine and which said first machine carries out a process during a working part of the production cycle on a workpiece which is loaded into and/or unloaded out of said first machine by said at least one second machine during a non-working part of each process cycle, the method comprising:

synchronizing said first machine to said second machine dependent on a speed or position of said second machine by adaptively controlling a speed of said first machine to decelerate said first machine at a point before a start point after which unloading is permitted; and synchronizing the speed of said first machine to said second machine by controlling the speed of said first machine and by decelerating said first machine at a start point before an estimated time at which said first machine shall reach the beginning of the unloading point stage towards zero speed and accelerating said first machine to reach an end point of a loading stage at a highest possible speed.

41. A method for operating a first machine of a manufacturing process section arranged to carry out a production cycle, said production cycle comprising a pressing part and a non-pressing part, wherein said first machine is operated in conjunction with at least one second machine, and wherein said first machine carries out a process during a working part of the production cycle on a workpiece that is loaded into and/or unloaded out of said first machine by said at least one second machine during a non-working part of each process cycle, the method comprising:

controlling operation of said first machine so as to depend on a speed or position of said second machine by adaptively controlling a speed of said first machine to decelerate said first machine at a point before a start point after which unloading is permitted.

* * * * *